United States Patent
Son

(10) Patent No.: US 12,512,178 B2
(45) Date of Patent: Dec. 30, 2025

(54) DATA CLUSTERING SYSTEM AND READ VOLTAGE DETERMINATION APPARATUS FOR MEMORY DEVICE USING THE DATA CLUSTERING SYSTEM

(71) Applicant: SK hynix Inc., Icheon-si (KR)

(72) Inventor: Jae Yong Son, Icheon-si (KR)

(73) Assignee: SK hynix Inc., Icheon-si (KR)

(*) Notice: Subject to any disclaimer, the term of this patent is extended or adjusted under 35 U.S.C. 154(b) by 208 days.

(21) Appl. No.: 18/531,227

(22) Filed: Dec. 6, 2023

(65) Prior Publication Data
US 2024/0404618 A1    Dec. 5, 2024

(30) Foreign Application Priority Data
Jun. 2, 2023 (KR) .................. 10-2023-0071594

(51) Int. Cl.
G11C 29/50 (2006.01)
G11C 7/20 (2006.01)
G11C 29/12 (2006.01)

(52) U.S. Cl.
CPC .......... G11C 29/50004 (2013.01); G11C 7/20 (2013.01); G11C 29/1201 (2013.01)

(58) Field of Classification Search
CPC .. G11C 29/50004; G11C 7/20; G11C 29/1201
See application file for complete search history.

(56) References Cited

U.S. PATENT DOCUMENTS

| | | | | |
|---|---|---|---|---|
| 9,530,522 | B1* | 12/2016 | Christensen | ..... G11C 29/50004 |
| 10,699,791 | B2* | 6/2020 | Pletka | .................. G06F 3/0604 |
| 11,636,161 | B1* | 4/2023 | Chang | .................. G06F 16/906 |
| | | | | 707/737 |
| 2024/0029787 | A1 | 1/2024 | Son et al. | |

FOREIGN PATENT DOCUMENTS

KR        101113006 B1    2/2012

OTHER PUBLICATIONS

Jee-Hye Kang et al., A Fast K-means and Fuzzy-c-means Algorithms using Adaptively Initialization, Apr. 31, 2004, pp. 516-524.

* cited by examiner

*Primary Examiner* — Han Yang
(74) *Attorney, Agent, or Firm* — WILLIAM PARK AND ASSOCIATES LTD.

(57) ABSTRACT

A data clustering system includes: an initialization circuit configured to receive a data set including a plurality of samples and a number K of groups, where K is a natural number, and determine at least a part number of initial centroids based on frequency of a data value of the sample, wherein the number of initial centroids corresponds to the number K of groups; and a classification circuit configured to group the plurality of samples based on a distance between the data value corresponding to the sample and each of centroids.

19 Claims, 10 Drawing Sheets

FIG. 10

| RETRY NO. | R1_os | R2_os | R3_os |
|---|---|---|---|
| 1 | R1_1 | R2_1 | R3_1 |
| 2 | R1_2 | R2_2 | R3_2 |
| 3 | R1_3 | R2_3 | R3_3 |
| 4 | R1_4 | R2_4 | R3_4 |
| ⋮ | ⋮ | ⋮ | ⋮ |
| K | R1_K | R2_K | R3_K |

DATA CLUSTERING SYSTEM AND READ VOLTAGE DETERMINATION APPARATUS FOR MEMORY DEVICE USING THE DATA CLUSTERING SYSTEM

CROSS-REFERENCES TO RELATED APPLICATION

The present application claims priority under 35 U.S.C. § 119 (a) to Korean application number 10-2023-0071594, filed on Jun. 2, 2023, in the Korean Intellectual Property Office, which is incorporated herein by reference in its entirety.

BACKGROUND

1. Technical Field

Various embodiments generally relate to a data analysis technique, and more particularly, to a data clustering system classifying data based on a similarity of a data value of the data and a read voltage determination apparatus for a memory device using the data clustering system.

2. Related Art

Data clustering is the task of grouping a set of observed data in such a way that data in the same group (called a cluster) are more similar property or characteristic to each other than to those in other groups (clusters).

One of well-known clustering algorithms may be k-means clustering (KMC).

The KMC is a method of classifying data in a data set into K groups in which each data belongs to the group based on the distance between each data value of the data and a centroid of the group to assign the data into an optimum group.

Because the way how to select initial centroids may result in a different running time for group assignment and distance calculation and a different accuracy of the clustering, the selection of the initial centroids may highly affect a performance of the KMC.

SUMMARY

In an embodiment, a data clustering system may include: an initialization circuit configured to receive a data set including a plurality of samples and K number of groups, where K is a natural number, and determine at least a part number of initial centroids based on frequency of a data value of the sample, wherein the number of initial centroids corresponds to the number K of groups; and a classification circuit configured to group the plurality of samples based on a distance between the data value corresponding to each of the samples and each of centroids.

In an embodiment, a data clustering method may be a method of operating a data clustering system and include: an initialization step receiving a data set including a plurality of samples and a number K of groups, where K is a natural number, and determining at least a part of initial centroids based on frequency of a data value of the sample, wherein the number of initial centroids corresponds to the number K of groups; and a classification step grouping the plurality of samples based on a distance between the data value of each of the samples and each of centroids and updating centroid of each group.

In an embodiment, a read voltage determination apparatus for a memory device may include: a test circuit configured to change threshold voltage distributions of memory cells coupled to a plurality of word lines and bit lines for each word line; a data acquisition circuit configured to select a plurality of word lines for each bit data level stored in the memory cells as a plurality of samples and generate an observed data set including the plurality of samples, wherein a data value of the sample is a read offset for each bit data level stored in each of the plurality of samples; and a read retry table generation circuit configured to receive the observed data set, determine at least a part of initial centroids based on frequency of the data value, and determine a read retry voltage by grouping the plurality of samples based on a distance between the data value corresponding to each of the samples and each of centroids.

BRIEF DESCRIPTION OF THE DRAWINGS

FIG. 10 is a diagram illustrating a read retry table according to an embodiment of the present disclosure.

DETAILED DESCRIPTION

Hereinafter, various embodiments of the present disclosure will be described in detail with reference to the accompanying drawings.

Figure 1A:
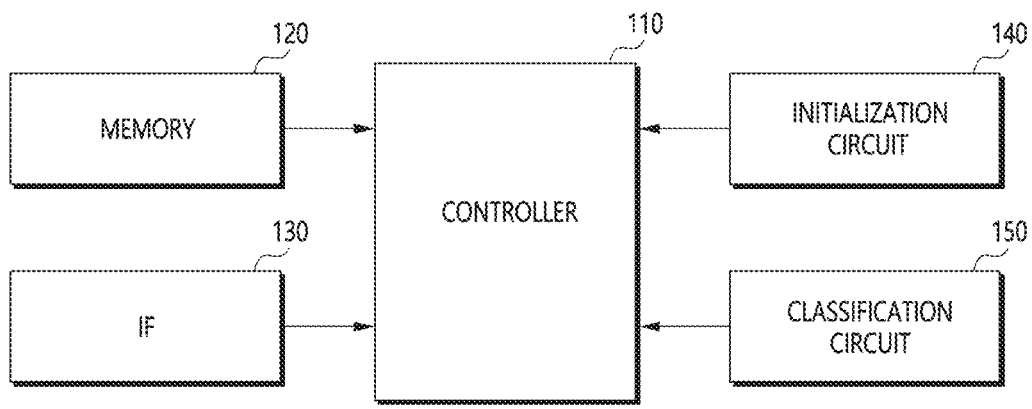
FIG. 1A is a block diagram illustrating a data clustering system according to an embodiment of the present disclosure.

FIG. 1A is a block diagram illustrating a data clustering system according to an embodiment of the present disclosure.

Referring to FIG. 1A, a data clustering system 10 in accordance with an embodiment of the disclosure may include a controller 110, a memory 120, an interface (IF) 130, an initialization circuit 140, and a classification circuit 150.

The controller 110 may control overall operations of the data clustering system 10.

The memory 120 may include a read only memory (ROM) and a random access memory (RAM), and may store and load various system data, firmware codes, software codes, etc., which are necessary for the operations of the data clustering system 10.

The controller 110 may control the overall operations of the data clustering system 10 by interpreting and executing instructions or algorithms which may be codes like the firmware codes or the software codes, etc. stored and loaded in the memory 120.

The interface 130 may provide an interfacing between the data clustering system 10 and an external device and an interfacing between the data clustering system 10 and an operator.

For clustering the data, an observed data set including a plurality of samples may be input through the interface 130 and analysis parameters may be initialized.

Each of the samples may include a discrete type data value having at least two Attributes. Accordingly, the data values of the sample may be expressed in at least a 2-dimensional array.

The analysis parameters may include the number K of clustering groups, where K is a natural number, and the maximum iteration number L, where L is a natural number.

The initialization circuit 140 is configured to determine at least a part number of initial centroids based on frequency of the data values of the samples included in the observed data set. In an embodiment of the present disclosure, the initialization circuit 140 may select data values with high frequency as at least a part of the initial centroid.

Figure 1B:
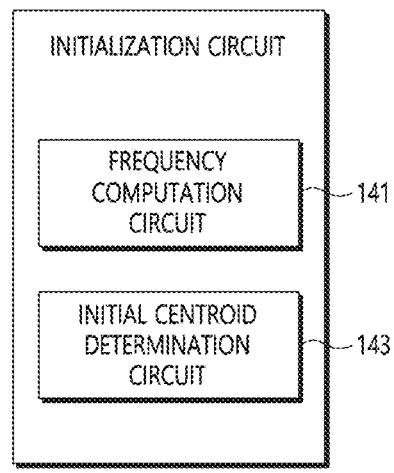
FIG. 1B is a block diagram illustrating an initialization circuit according to an embodiment of the present disclosure.

FIG. 1B is a block diagram illustrating an initialization circuit according to an embodiment of the present disclosure.

Referring to FIG. 1B, the initialization circuit 140 in accordance with an embodiment of the disclosure may include a frequency computation circuit 141 and an initial centroid determination circuit 143.

The data value of the sample included in the data set can be expressed in at least the 2-dimensional discrete array. The frequency computation circuit 141 may sort the samples in order of frequency of the same data value. The initial centroid determination circuit 143 may choose data values in order of frequency or data values with frequency equal to or greater than a threshold, as at least a part of K centroids.

In an embodiment of the present disclosure, the initial centroid determination circuit 143 may determine an initial centroid by selecting K data values in order of frequency of the data value, where K is the number of groups.

In an embodiment of the present disclosure, the initial centroid determination circuit 143 may select a first number m of data values with frequency greater than the first threshold TH1 among the data values, where m is a natural number and $1 \leq m < K$, as a primary initial centroid(s). If the first number m or more of the data values with frequency greater than the first threshold TH1 are detected, the first number m of the data values are selected in order of frequency of the data value or randomly among the data values with frequency greater than the first threshold TH1 as the primary initial centroids.

In an embodiment of the present disclosure, the initial centroid determination circuit 143 may select a reference value located at the farthest point from the primary initial centroids, and select the data value with frequency greater than a second threshold TH2 and nearest with the reference value as the secondary initial centroid, wherein TH2<TH1. In order that the sum of the primary initial centroids and the secondary initial centroids corresponds to the number of groups, K, the process of selecting the secondary initial centroid may be iteratively performed.

In an embodiment of the present disclosure, the initial centroid determination circuit 143 may randomly select a second number (K-m) of data values among the data values which are not selected as the primary initial centroids, as the secondary initial centroids.

The classification circuit 150 may group each sample included in the data set into K groups based on a similarity between the sample and the centroid, e.g., distances such as an Euclidean Distance between the data value of the sample and the centroids.

According to an embodiment of the present disclosure, the classification circuit 150 may classify the samples according to the similarity through group assignment and centroid update.

Figure 1C:
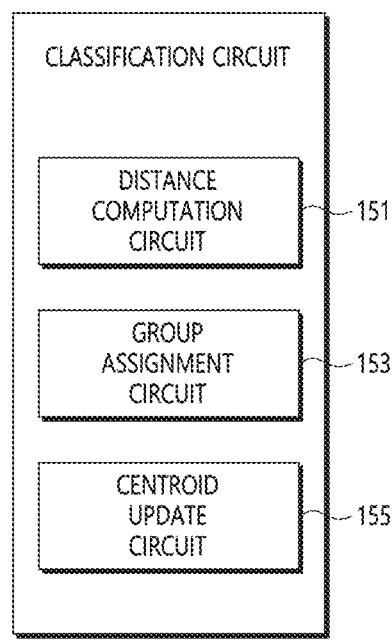
FIG. 1C is a block diagram illustrating a classification circuit according to an embodiment of the present disclosure.

FIG. 1C a block diagram illustrating a classification circuit according to an embodiment of the present disclosure.

Referring to FIG. 1C, the classification circuit 140 in accordance with an embodiment of the disclosure may include a distance computation circuit 151, a group assignment circuit 153 and a centroid update circuit 155.

The distance computation circuit 151 may calculate a distance between the data value of each sample and each centroid. The distance between the data value of the sample and the centroid, i.e., the calculation result, is stored in the memory 120 and managed as a lookup table.

The group assignment circuit 153 may assign the sample into the group of which the centroid is nearest with the sample. If all the samples are assigned to the groups, the centroid update circuit 155 update the centroid in each group. The centroid update may be performed based on a mean value or the most frequent value.

The group assignment process and the centroid update process may be iteratively performed up to a maximum iteration number L. If a degree of change of the group assignment is smaller than the tolerance before the number of iterations is equal to the maximum iteration number L, the classification process may be terminated.

Like this, if the initial centroid is determined based on the frequency of the data value of the sample, the number s of samples having the data values determined as the centroids among the number Y of the total samples in the data set is dominant. Accordingly, the number t of non-centroids used for calculating the distance from the centroid, where $t=(Y-s) \ll (Y-K)$, may be reduced. Therefore, the number (t*K) of iterations for calculating the distance between the centroid and non-centroid and operations necessary for the group assignment may be reduced.

Figure 2:
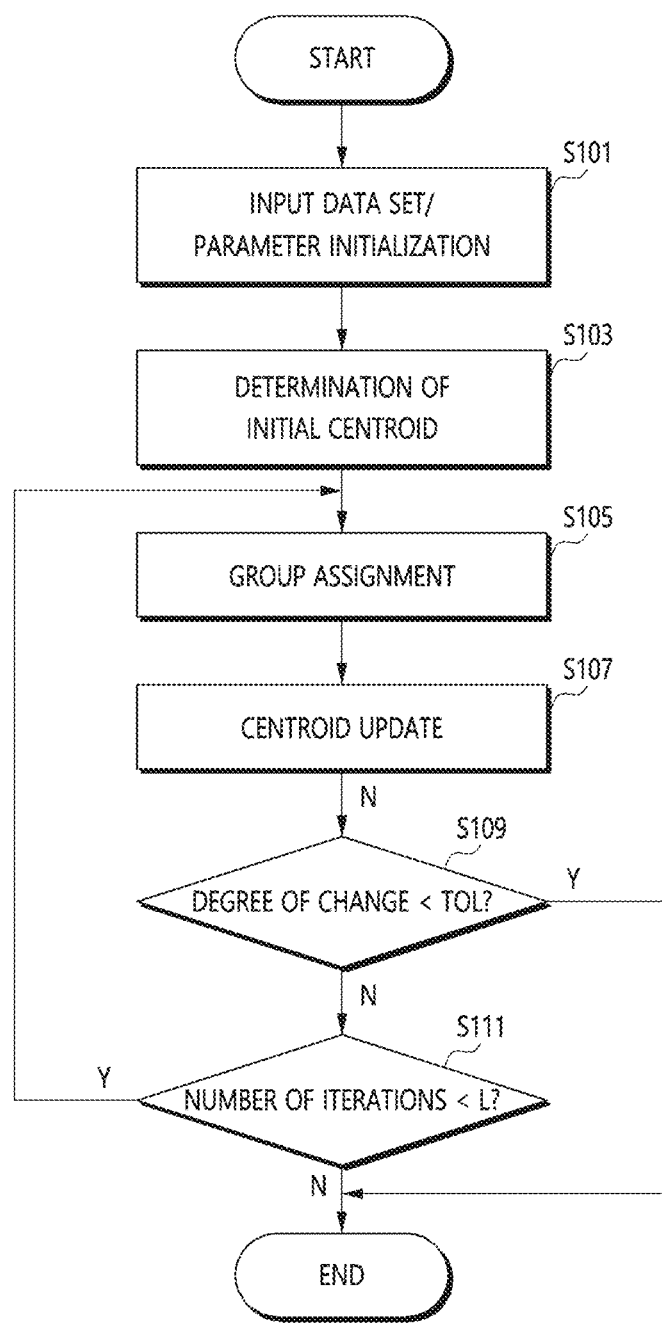
FIG. 2 is a flow chart illustrating a data clustering method according to an embodiment of the present disclosure.

FIG. 2 is a flow chart illustrating a data clustering method according to an embodiment of the present disclosure.

Referring to FIG. 2, an observed data set including a plurality of samples may be input to the data clustering system 10, and analysis parameters may be initialized at step S101.

Each sample may have a discrete type data value having at least two Attributes. The analysis parameters may include the number K of clustering groups and the maximum iteration number L.

The initialization circuit 140 of the data clustering system 10 may determine K initial centroids based on the data values of the samples included in the observed data set at step S103. At least a part of the initial centroids may be determined based on the frequency of the data value of the sample, which will be described below with reference to FIGS. 3 through 5.

The classification circuit 150 of the data clustering system 10 may assign each sample to one of K groups each having the centroid based on a similarity between the sample and the centroid, for example, a Euclidean distance between the data value of the sample and the data value of the centroid at step S105.

If all the samples are assigned to the centroids, i.e., groups, the classification circuit 150 may update the centroid in each group at step S107. The centroid update may be performed based on the mean value or the most frequent value.

In case that the centroid is updated based on the mean value, the classification circuit 150 may calculate a mean distance between the current centroid and the data values in each group, quantize the mean distance as a discrete mean value, and update the discrete mean value as a new centroid.

In case that the centroid is updated based on the most frequent value, the classification circuit 150 may determine the most frequent data value in each group as a new centroid. If there are multiple most frequent data values, one of the most frequent data values may be randomly selected.

After updating the centroids, the classification circuit 150 of the data clustering system 10 may check whether the degree of the change of the group assignment is smaller than a tolerance TOL at step S109. The degree of the change of the group assignment may be a difference between the previous centroid and the updated centroid.

If the degree of the change of the group assignment is smaller than the tolerance TOL (S109: Y), the data classification process may be terminated.

If the degree of the change of the group assignment is equal to or greater than the tolerance TOL (S109: N), it may be checked whether the number of iterations, i.e., the number of the group assignment process S105 and the centroid update process S107 being performed is smaller than the maximum iteration number L at step S111.

If the number of iterations is smaller than the maximum iteration number L (S111: Y), the operation may return to the step S105 to iterate the operation. If not (S111: N), the process may be terminated.

Figure 3:
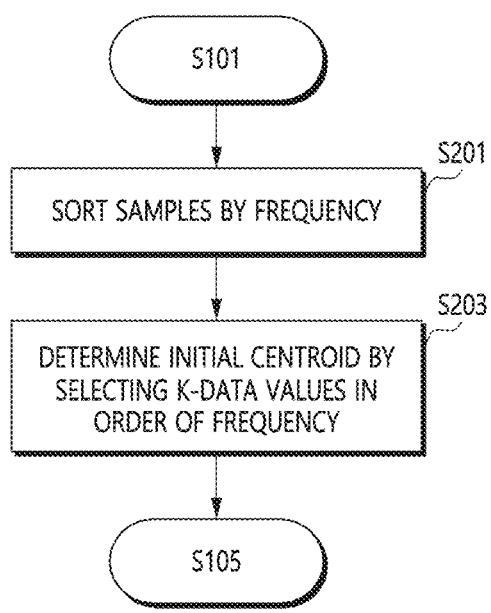
FIG. 3 is a flow chart illustrating an initial centroid determination process according to an embodiment of the present disclosure.

FIG. 3 is a flow chart illustrating an initial centroid determination process according to an embodiment of the present disclosure.

Referring to FIG. 3, the initialization circuit 140 may sort the samples included in the data set by the frequency of the data value of the sample at step S201.

The initialization circuit 140 may determine the initial centroids by selecting K data values in order of frequency of the data value at step S203, where K is the set number of the groups.

In other words, in an embodiment of the present disclosure, K most frequent data values may be selected as the initial centroid.

Figure 4:
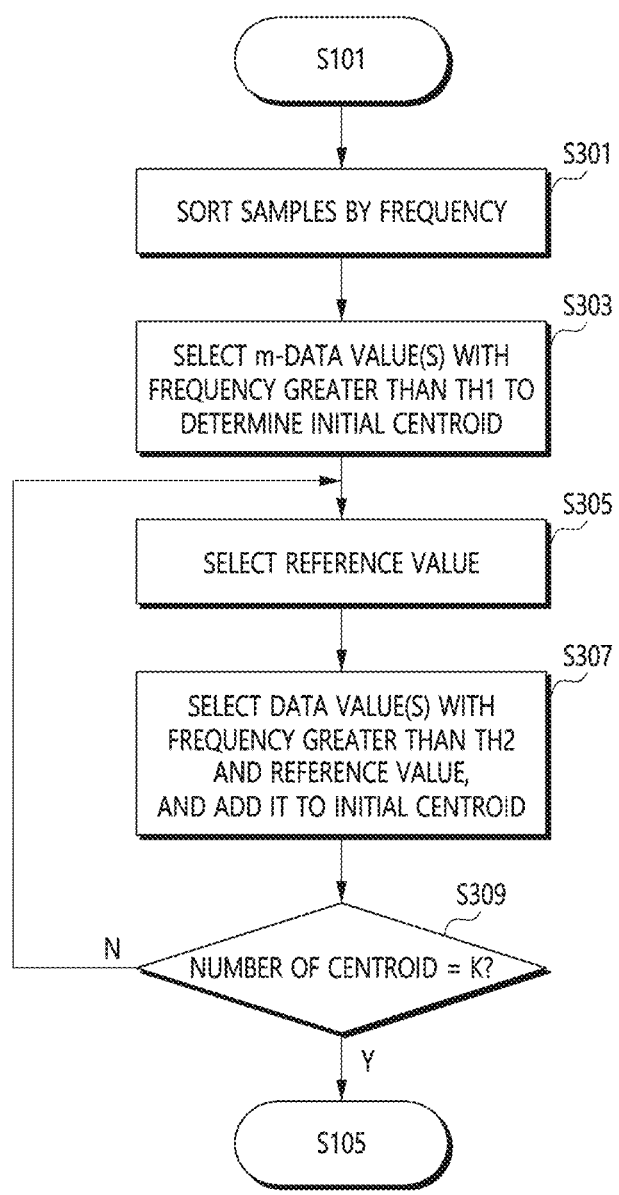
FIG. 4 is a flow chart illustrating an initial centroid determination process according to an embodiment of the present disclosure.

FIG. 4 is a flow chart illustrating an initial centroid determination process according to an embodiment of the present disclosure.

Referring to FIG. 4, the initialization circuit 140 may sort samples included in the data set by the frequency of the data value of the sample at step S301.

The initialization circuit 140 may select a set number m of data values with frequency greater than a set first threshold TH1 as primary initial centroids at step S303, where m is a natural number and $1 \leq m < K$. If multiple data values with frequency greater than the first threshold TH1 are detected, the initialization circuit 140 may select m data values among the data values with frequency greater than the first threshold TH1 in order of frequency of the data value or randomly as the primary initial centroids.

To select K-m number of secondary initial centroids, the initialization circuit 140 may select a reference value which is located at the farthest point from each of the m primary initial centroids at step S305.

The initialization circuit 140 may select a data value with frequency greater than a set second threshold TH2 and nearest with the reference value, where TH2<TH1, as a secondary initial centroid at step S307.

The initialization circuit 140 may check whether the number of total initial centroids, i.e., sum of the number of the primary initial centroids and the number of the secondary initial centroids is equal to the set number K of initial centroids at step S309. If the number of the total initial centroids being selected is equal to the set number K of initial centroids (S309: Y), the initialization process is terminated, and the data clustering system 10 may perform a group assignment process at step S105.

If the number of the total initial centroids being selected is not equal to the set number K of initial centroids (S309: N), the initialization circuit 140 may return to the step S305 to continuously add an initial centroid.

Figure 5:
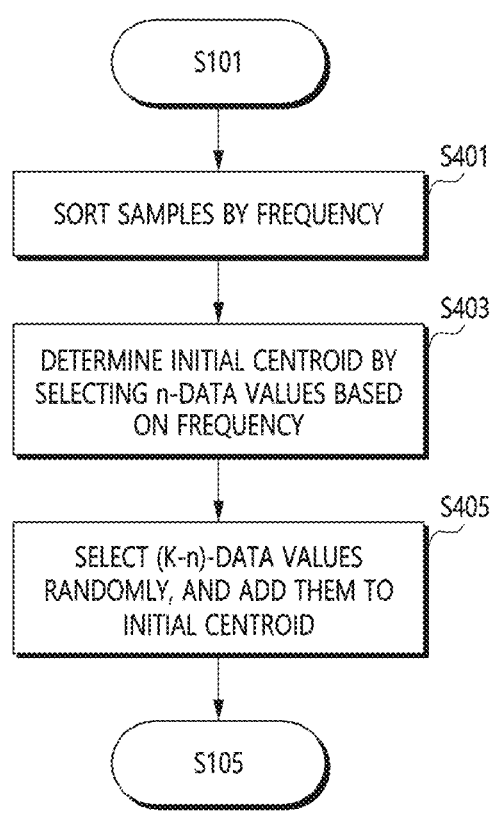
FIG. 5 is a flow chart illustrating an initial centroid determination process according to an embodiment of the present disclosure.

FIG. 5 is a flow chart illustrating an initial centroid determination process according to an embodiment of the present disclosure.

Referring to FIG. 5, the initialization circuit 140 may sort samples included in the data set by the frequency of the data value of the sample at step S401.

The initialization circuit 140 may determine n primary initial centroids, which is a part of initial centroids, where n is a natural number and $1 \leq n < K$, based on frequency of the data value at step S403.

In an embodiment of the present disclosure, the initialization circuit 140 may select n data values in order of frequency as the primary initial centroids.

In an embodiment of the present disclosure, the initialization circuit 140 may select n data values with frequency greater than the first threshold TH1 as the primary initial centroids. If multiple data values with frequency greater than the first threshold TH1 are detected, the initialization circuit 140 may select n data values may be selected in order of frequency of the data values or randomly among the data values with frequency greater than the first threshold TH1 as the primary initial centroids.

The initialization circuit 140 may randomly select (K-n) data values among the data values which are not selected as the primary initial centroids as secondary initial centroids at step S405.

If the initial centroids are selected by any one of the methods illustrated in FIGS. 3 to 5, the data clustering system 10 may assign each of the samples to an optimum group by iterating the group assignment and the centroid update.

In an embodiment, a percentage of the samples selected as the initial centroids in the samples included in the observed data set is high.

Moreover, in an embodiment, if the calculation result of distances between centroids and non-centroids may be stored in a form of a look-up table, the operations and time necessary for calculating the distance between the centroids and the non-centroids can be further reduced.

The KMC is one of unsupervised learning techniques and may be used to extract information from the data by grouping data values into clusters and identifying similar pattern or operation of the data.

For an example, the KMC may be used for determining optimal parameters necessary for operations of a semiconductor memory device.

The read Attributes of the semiconductor memory device may be changed by shifting the distribution of threshold voltages due to read disturb, retention, etc. After shifting the distribution of the threshold voltages, if the read operation is performed using the default read voltage which is optimized for the previous distribution of threshold voltages, a read error may occur. When the read error occurs, to retry the read operation with a changed read voltage, a read retry table (RRT) may be included when manufacturing the semiconductor memory device.

The RRT is a table storing a plurality of read voltage sets which are determined considering variation of threshold voltages of the memory cells. To retry the read operation up to a set number of times, the RRT may include the read voltage sets each of which is applied at every retry step.

The memory device used in the memory system may include a plurality of memory dies each of which is a set of memory cell arrays.

The plurality of memory dies produced from the same wafer may have similar Attributes with each other as compared with the memory dies produced from a different wafer, and the memory cells included in the same memory die may have similar Attributes with each other as compared with the memory cells included in another memory die.

When manufacturing memory devices, if the RRT is generated based on read Attributes of sample memory cells, which are collected and classified at a wafer level or a die level, the RRT can be applied to the memory cells from the same wafer or the same die having the similar Attributes.

Figure 6:
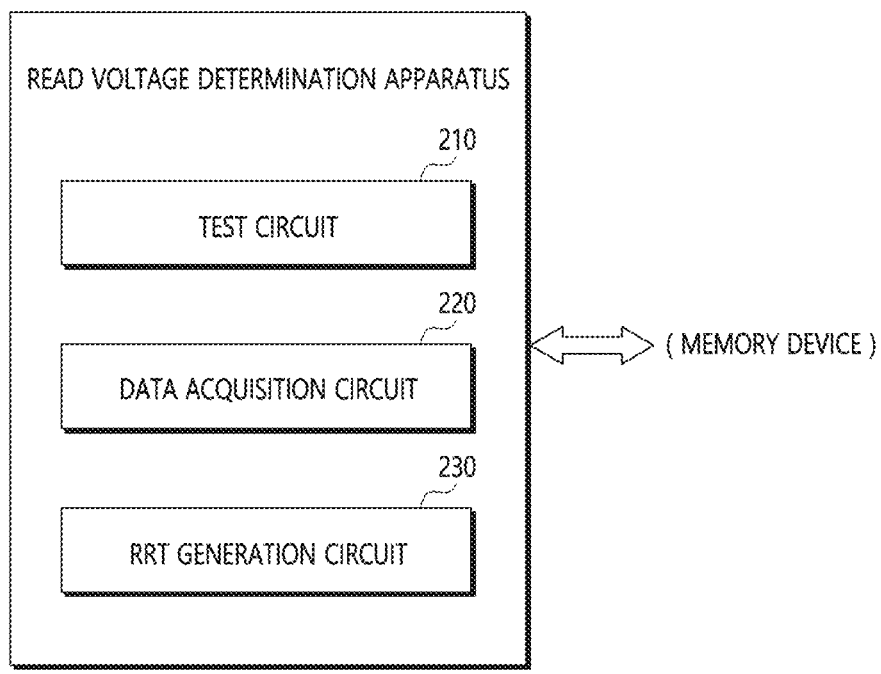
FIG. 6 is a block diagram illustrating a read voltage determination apparatus for a memory device according to an embodiment of the present disclosure.

FIG. 6 is a block diagram illustrating a read voltage determination apparatus for a memory device according to an embodiment of the present disclosure.

Referring to FIG. 6, a read voltage determination apparatus 20 may be configured to be electrically coupled to a memory device and determine read retry voltages of the memory device.

Figure 7:
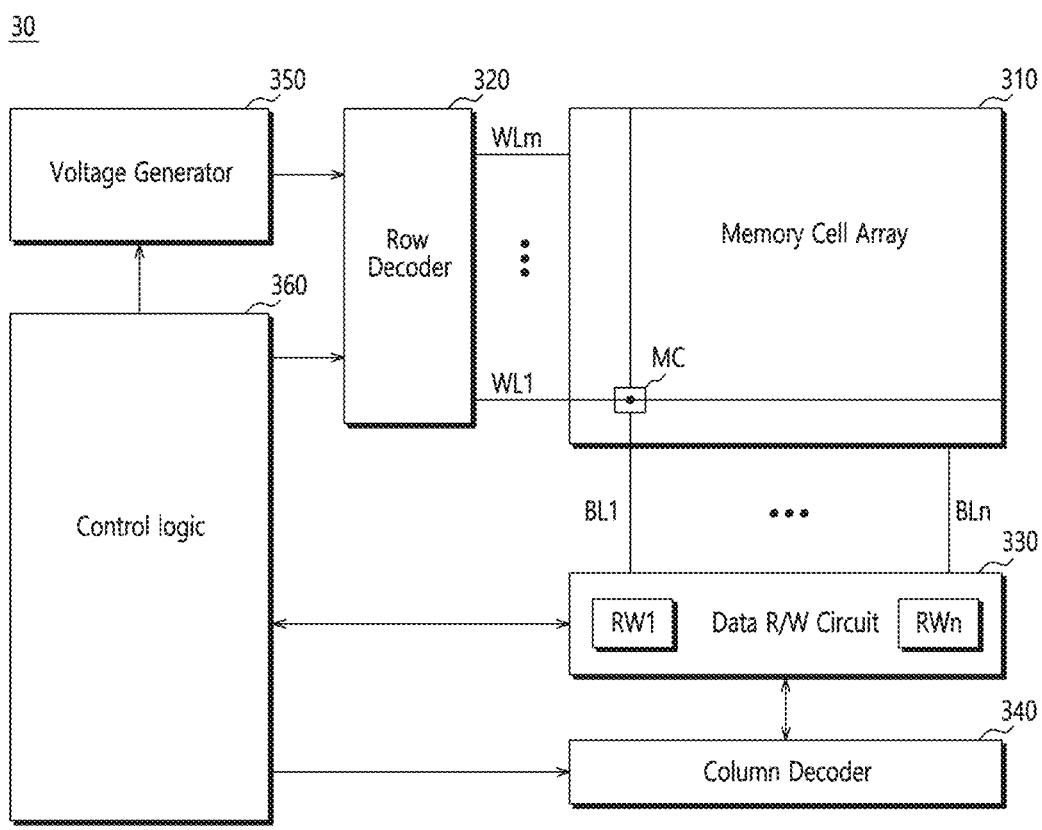
FIG. 7 is a block diagram illustrating a memory device according to an embodiment of the present disclosure.

FIG. 7 is a block diagram illustrating a memory device according to an embodiment of the present disclosure.

Referring to FIG. 7, a nonvolatile memory device 30 may include a memory cell array 310, a row decoder 320, a data read/write circuit 330, a column decoder 340, a voltage generator 350, and control logic 360. The control logic 360 may be implemented as hardware, software, or a combination of hardware and software. For example, the control logic 360 may be a control logic circuit operating in accordance with an algorithm and/or a processor executing control logic code.

The memory cell array 310 may be formed in 2-dimensional or 3-dimensional with respect to the plane of the semiconductor substrate, and include memory cells MC arranged at the cross of word lines WL1-WLm and bit lines BL1-BLn.

Each of the memory cells may store 1-bit (single bit) data or M-bit (multi bit) data, where M is an integer equal to or greater than 2. The memory cell array 310 may include a plurality of dies, a plurality of chips, or a plurality of packages. Each die may be managed by a page basis in which a page includes memory cells sharing the same word line, or a memory block basis in which a set number of the pages are grouped to a memory block.

The row decoder 320 may be coupled to the memory cell array 310 through the word lines WL1-WLm. The row decoder 320 may be operated in accordance with a control of the control logic 360. The row decoder 320 may decode an address received from an external device (not illustrated). The row decoder 320 may select and drive word lines WL1-WLm based on the decoding result. For example, the row decoder 320 may provide the word lines WL1-WLm with a word line voltage received from the voltage generator 350.

The data read/write circuit 330 may be coupled to the memory cell array 310 through bit lines BL1-BLn. The data read/write circuit 330 may include read/write blocks RW1-RWn corresponding to the bit lines BL1-BLn respectively. The data read/write circuit 330 may be operated in accordance with the control of the control logic 360. The data read/write circuit 330 may operate as a write driver or a sense amplifier in accordance with an operation mode. For example, the data read/write circuit 330 may operate as the write driver storing the data received from the external device in the memory cell array 310 at a write operation. For another example, the data read/write circuit 330 may operate as the sense amplifier reading the data from the memory cell array 310 at a read operation.

The column decoder 340 may be operated in accordance with a control of the control logic 360. The column decoder 340 may decode the address received from the external device. The column decoder 340 may couple the read/write blocks RW1-RWn of the data read/write circuit 330 corresponding to the bit lines BL1-BLn respectively to data input/output lines or data input/output buffers based on the decoding results.

The voltage generator 350 may generate voltages used for background operations of the nonvolatile memory device 30. The voltages generated by the voltage generator 350 may be applied to the memory cells of the memory cell array 310. For example, a program voltage generated at a program operation may be applied to the word line of the memory cells to be programmed. For another example, an erase voltage generated at an erase operation may be applied to well-regions of the memory cells to be erased. For another example, a read voltage generated at a read operation may be applied to the word line of the memory cells to be read.

The control logic 360 may control overall operations of the nonvolatile memory device 30 based on the control signal received from the external device. For example, the control logic 360 may control read, write, and erase operations of the nonvolatile memory device 30.

Referring to FIG. 6 again, a read voltage determination apparatus 20 may include a test circuit 210, a data acquisition circuit 220, and a RRT generation circuit 230.

The test circuit 210 may perform a test to change a distribution of threshold voltages of the memory cells included in the memory device. For example, the test circuit 210 may generate a test pattern inducing read disturbance to the memory device, provide the pattern with the read disturbance to the memory device, and read the data stored in the memory device. For another example, the test circuit 210 may generate a test pattern inducing retention to the memory device, program the memory device with the retention, and read the data stored in the memory device. The test circuit 210 may generate a test pattern that makes the memory device store all storable data and perform the test. In the case of the memory device performing the programming by a page basis, like a flash memory device, the same test pattern is recorded for each word line, and therefore the distribution of the threshold voltages may be varied based on the test pattern.

The data acquisition circuit 220 may select a plurality of sample word lines for each data level stored in the memory device by the test circuit 210, check the threshold voltage of the sample word line for each data level, and determine an optimal read voltage for each sample word line.

The data acquisition circuit 220 may generate an observed data set including data of which data values are read offsets each of which is obtained by subtracting a preset default read voltage from the optimal read voltage of each sample word line for each data level. The word "preset" as used herein with respect to a parameter, such as a preset default read voltage or preset number of times, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

The RRT generation circuit 230 may receive the data set generated by the data acquisition circuit 220 and partition the read offsets into a set number of offset groups for each data level. The number of the offset groups may correspond to the read retry number, a representative value of the offset group for the data level may be used to determine the read voltage applied to the read retry process.

In an embodiment of the present disclosure, the RRT generation circuit 230 may be implemented using the initialization circuit 140 and the classification circuit 150 comprised in the data clustering system illustrated in FIG. 1A.

Figure 8:
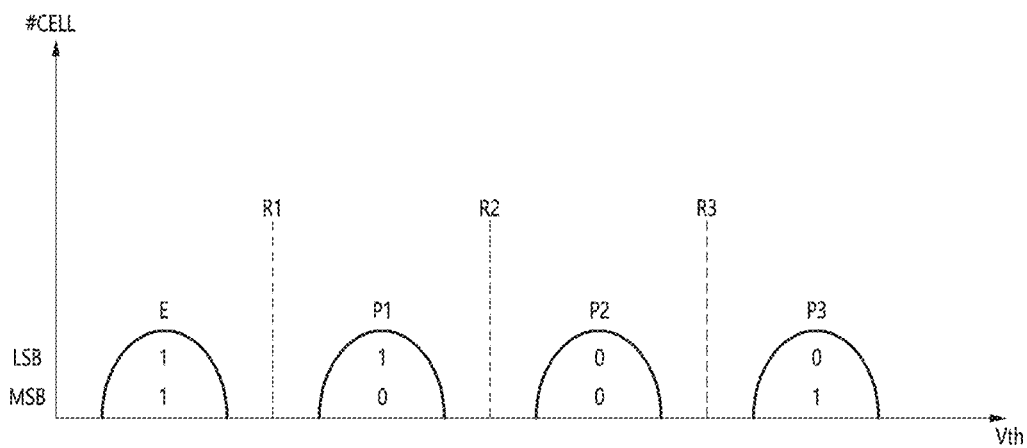
FIG. 8 is a diagram illustrating a read voltage level according to an embodiment of the present disclosure.
Figure 9:
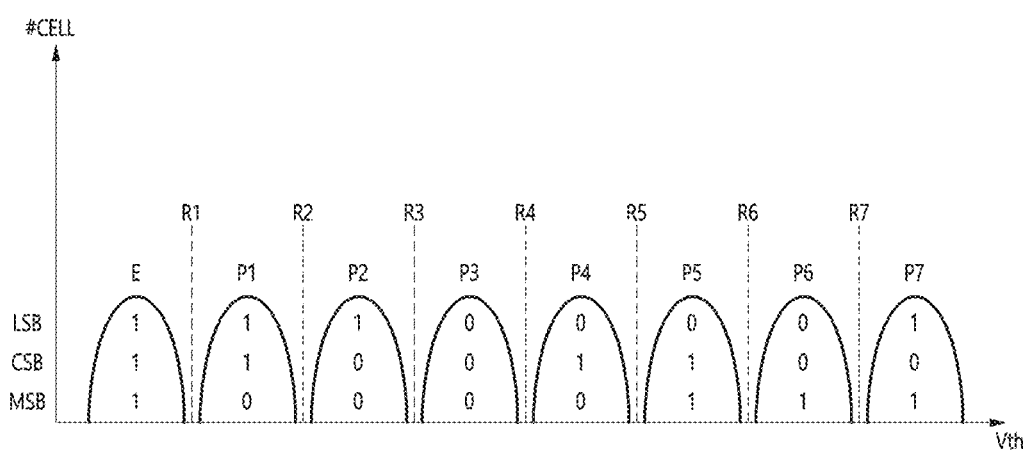
FIG. 9 is a diagram illustrating a read voltage level according to an embodiment of the present disclosure.

FIGS. 8 and 9 are diagrams illustrating read voltage levels according to an embodiment of the present disclosure.

Each memory cell included in a multi-level cell (MLC) memory device may store 2-bit data having a most significant bit (MSB) and a least significant bit (LSB). Each of the memory cells of the MLC memory device may have the threshold voltages corresponding to one of states, e.g., an erase state "E" and first to third programmed states "P1" to "P3" in accordance with the programmed data values, as illustrated in FIG. 8. In an embodiment, for FIGS. 8 and 9, the vertical axis represents the number of memory cells (#CELL) and the horizontal axis represents the voltage thresholds Vth.

The flash memory may perform a read operation on a page-by-page, one page may include a plurality of memory cells. One page may be physically "1," but may conceptually include a first logical page and a second logical page corresponding to the LSB and the MSB, respectively. The first logical page may indicate the bit storing LSB data and the second logical page may indicate the bit storing MSB data. The LSB data and the MSB data may represent data corresponding to the LSB and the MSB which are 2 bits of data stored in the memory cell. At the read operation, the memory cells of which the LSB is '1' and the memory cells of which the LSB is '0' may be identified by applying LSB read voltage R2 corresponding to the first logical page, and the memory cells of which the MSB is '0' and the memory cells of which the MSB is '1' may be identified by applying MSB read voltages R1 and R3 corresponding to the second logical page.

Each memory cell included in a triple-level cell (TLC) memory device may store 3-bit data including a most significant bit (MSB), a central significant bit (CSB), and a least significant bit (LSB). The memory cell of the TLC memory device may have the threshold voltages corresponding to one of states, e.g., an erase state "E" and first to seventh programmed states "P1" to "P7" in accordance with the programmed data value, as illustrated in FIG. 9.

In case of the TLC memory device, one page may be physically "1," but may conceptually include first to third logical pages corresponding to the LSB, the CSB, and the MSB. The first to third logical pages may respectively store LSB data, CSB data, and MSB data.

At the read operation, the memory cells of which the LSB is '1' and the memory cells of which the LSB is '0' may be identified by applying LSB read voltages R3 and R7 corresponding to the first logical page. The memory cells of which the CSB is '0' and the memory cells of which the CSB is '1' may be identified by applying CSB read voltages R2 and R4 corresponding to the second logical page. The memory cells of which the MSB is '0' and the memory cells of which the MSB is '1' may be identified by applying MSB read voltages R1 and R5 corresponding to the third logical page.

The test circuit 210 illustrated in FIG. 6 may perform the programming of the memory device for each data level.

The data acquisition circuit 220 may obtain offsets by subtracting the preset default read voltages from the optimal read voltages of each logical page for the plurality of the sample word lines which are selected for each data level programmed to the memory device and generate an observed data set including the offsets. The observed data set may be expressed in at least a 2-dimensional array.

In case of the MLC memory device, the data set may include a discrete 2-dimensional array [R2_os, null] having offsets to the LSB read voltage R2 and a discrete 2-dimensional array [R1_os, R3_os] having offsets to the MSB read voltages R1 and R3.

In case of the TLC memory device, the data set may include a discrete 2-dimensional array [R3_os, R7_os] having offsets to the LSB read voltages R3 and R7, a discrete 3-dimensional array [R2_os, R4_os, R6_os] having offsets to the CSB read voltages R2, R4, and R6, and a discrete 2-dimensional array [R1_os, R5_os] having offsets to the MSB read voltages R1 and R5.

The RRT generation circuit 230 may receive the data set generated by the data acquisition circuit 220 and partition offsets of the read voltages for each data level into a set number of groups. In other words, the RRT generation circuit 230 may classify the offsets of the read voltages of each logical page into the set number of groups, where the set number corresponds to the read retry number, determine centroids each of which is a representative value of the group as the offset of the read voltage applied to the read retry process, and build a table listing the result.

For example, to determine the offsets of the read voltages to the LSB page of the TCL memory device, the RRT generation circuit 230 may receive the discrete 2-dimensional array [R3_os, R7_os] including offsets to the LSB read voltages R3 and R7 for each sample word line and group the offsets of the read voltages based on the KMC method.

The RRT generation circuit 230 may adopt the data clustering system and methods illustrated in FIGS. 1 to 5.

In other words, the RRT generation circuit 230 may determine at least a part of initial centroids based on the frequency of the data values [R3_os, R7_os] of the samples included in the observed data set, and group the data values [R3_os, R7_os] by iterating the group assignment process and the centroid update process.

FIG. 10 is a diagram illustrating a read retry table according to an embodiment of the present disclosure.

In FIG. 10, the RRT for the MLC memory device is illustrated.

The RRT may be generated as a look-up table in which the retry iteration number RETRY NO. is K and includes read voltage offsets R1_os, R2_os, R3_os for each logical page determined at every iterative step RETRY NO. 1 to RETRY NO. K.

While various embodiments have been described above, it will be understood to those skilled in the art that various changes and modifications may be made therein without departing from the spirit and scope of the present disclosure. It should be understood that the embodiments described above are examples only and the present disclosure is not limited to the embodiments. The scope of the present disclosure may be defined in the following claims rather than the described embodiments, and the present disclosure encompasses all such changes and modifications that fall within the scope of the claims and the equivalents thereof.

What is claimed is:

1. A data clustering system comprising:
an initialization circuit configured to receive a data set including a plurality of samples and K number of groups, where K is a natural number, and determine at least a part number of initial centroids based on frequency of a data value of the sample, wherein the number of initial centroids corresponds to the number K of groups; and
a classification circuit configured to group the plurality of samples based on a distance between the data value corresponding to each of the samples and each of centroids.

2. The data clustering system according to claim 1, wherein the data value includes at least 2-dimensional discrete array.

3. The data clustering system according to claim 1, wherein the initialization circuit is configured to determine the initial centroids by selecting K data values in order of frequency.

4. The data clustering system according to claim 1, wherein the initialization circuit is configured to select a first number, m, of the data values with frequency greater than a first threshold among the data values, wherein m is a natural number and 1≤m<K, as primary initial centroids.

5. The data clustering system according to claim 4, wherein, when the first number m or more of the data values with frequency greater than the first threshold are detected, the initialization circuit is configured to select the first number m of the data values in order of frequency of the data value or randomly among the data values with frequency greater than the first threshold as the primary initial centroids.

6. The data clustering system according to claim 4, wherein the initialization circuit is configured to select a reference value located at the farthest point from the primary initial centroids, and select the data value with frequency greater than a second threshold and nearest with the reference value as a secondary initial centroid, wherein TH2<TH1.

7. The data clustering system according to claim 4, wherein the initialization circuit is configured to randomly select a second number of data values which are not selected as the primary initial centroids, as secondary initial centroids, where the second number is equal to K-m.

8. The data clustering system according to claim 1, wherein the classification circuit is configured to store calculation results of the distance between the data value of each of the samples and each of the centroids in a memory.

9. The data clustering system according to claim 1, wherein the classification circuit is configured to perform:
a process of assigning each of the plurality of the samples to the group with the nearest centroid, and
a process of updating the centroid of each group, up to a set number of times.

10. A read voltage determination apparatus comprising:
a test circuit configured to change threshold voltage distributions of memory cells coupled to a plurality of word lines and bit lines for each word line;
a data acquisition circuit configured to select a plurality of word lines for each bit data level stored in the memory cells as a plurality of samples and generate an observed data set including the plurality of samples, wherein a data value of the sample is a read offset for each bit data level stored in each of the plurality of samples; and
a read retry table generation circuit configured to receive the observed data set, determine at least a part of initial centroids based on frequency of the data value, and determine a read retry voltage by grouping the plurality of samples based on a distance between the data value corresponding to each of the samples and each of centroids.

11. The read voltage determination apparatus according to claim 10,
wherein the read retry table generation circuit is configured to include:
an initialization circuit configured to receive the observed data set and K number of groups, where K is a natural number, and determine at least a part of initial centroids based on frequency of the data value of the sample, the number of initial centroids corresponding to the number K of groups; and
a classification circuit configured to group the plurality of samples based on the distance between the data value corresponding to each of the samples and the initial centroids.

12. The read voltage determination apparatus according to claim 11,
wherein the initialization circuit is configured to determine the initial centroids by selecting K data values in order of frequency.

13. The read voltage determination apparatus according to claim 11,
wherein an initialization circuit is configured to select a first number, m, of the data values with frequency greater than a first threshold among the data values, wherein m is a natural number and 1≤m<K, as primary initial centroids.

14. The read voltage determination apparatus according to claim 13,
wherein, when the first number m or more of the data values with frequency greater than the first threshold TH1 are detected, the initialization circuit is configured to select the first number m of the data values in order of frequency of the data value or randomly among the data values with frequency greater than the first threshold as the primary initial centroids.

15. The read voltage determination apparatus according to claim 13,
wherein the initialization circuit is configured to select a reference value located at the farthest point from the primary initial centroids, and select the data value with frequency greater than a second threshold and nearest with the reference value as a secondary initial centroid, wherein TH2<TH1.

16. The read voltage determination apparatus according to claim 13,
    wherein the initialization circuit is configured to randomly select a second number of data values which are not selected as the primary initial centroids, as secondary initial centroids, where the second number is equal to K-m.

17. The read voltage determination apparatus according to claim 11,
    wherein the classification circuit is configured to store calculation results of the distance between the data value of each of the samples and each of the centroids in a memory.

18. The read voltage determination apparatus according to claim 11,
    wherein the classification circuit is configured to perform:
        a process of assigning each of the plurality of the samples to the group with the nearest centroid, and
        a process of updating the centroid of each group, up to a set number of times.

19. The read voltage determination apparatus according to claim 10,
    wherein the read offset is determined by subtracting the set default read voltage from the optimal read voltage for each bit data level stored in each of the plurality of the samples.

* * * * *